United States Patent [19]

Koizumi

[11] Patent Number: 5,274,709
[45] Date of Patent: Dec. 28, 1993

[54] SPEAKER DEVICE FOR TELEVISION RECEIVER

[75] Inventor: Hiroshi Koizumi, Saitama, Japan
[73] Assignee: Sony Corporation, Tokyo, Japan
[21] Appl. No.: 803,996
[22] Filed: Dec. 9, 1991
[30] Foreign Application Priority Data
  Dec. 22, 1990 [JP] Japan .................. 2-413073
[51] Int. Cl.⁵ .............................. H04R 5/00
[52] U.S. Cl. ............................ 381/24; 381/88;
  381/90; 381/188; 381/205; 358/254; 181/145; 181/155; 181/176
[58] Field of Search ........... 381/24, 88, 90, 188, 381/205; 181/144, 145, 155, 176; 358/254

[56] References Cited
U.S. PATENT DOCUMENTS

3,759,345  9/1973  Borisenko .................. 381/24
4,164,631  8/1979  Garner et al. ............. 181/176
4,907,671  3/1990  Wiley ........................ 181/155
5,105,905  4/1992  Rice .......................... 181/155

Primary Examiner—John K. Peng
Assistant Examiner—Edward Lefkowitz
Attorney, Agent, or Firm—Lewis H. Eslinger; Jay H. Maioli

[57] ABSTRACT

A speaker unit for a television receiver includes speakers SP$_L$, SP$_R$ arranged at the back of a television screen surface, sound reflectors for reflecting the sound from the speakers substantially in a forward direction from the television screen surface, and acoustic lenses provided on a surface coplanar with the television screen surface for controlling the sound radiating direction. A high quality sound with a sense of ambience and compatibility with the television picture may be produced without enlarging the size of the television receiver cabinet.

5 Claims, 7 Drawing Sheets

FIG. 11

SPEAKER DEVICE FOR TELEVISION RECEIVER

BACKGROUND OF THE INVENTION

1. Field of the Invention

This invention relates to a speaker device for a television receiver.

2. Description of the Prior Art

Certain conventional television receivers and speaker devices therefor are constructed as shown for example in FIGS. 1 to 4.

Figure 1:
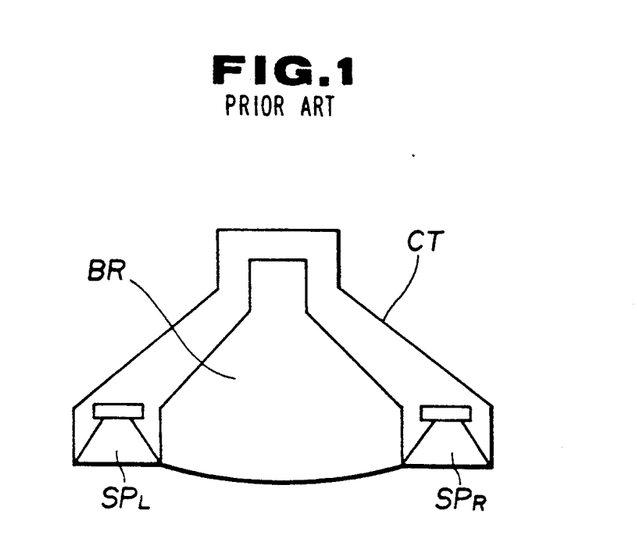
FIGS. 1 to 4 are schematic side views showing different types of conventional television receivers.
Figure 2:
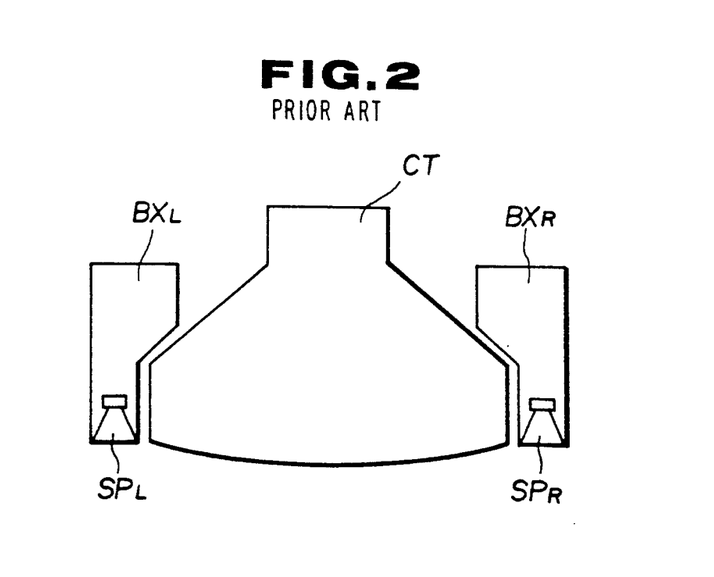
Figure 3:
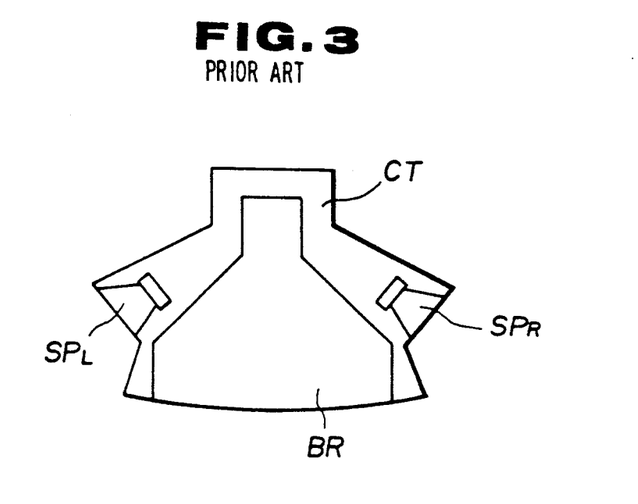
Figure 4:
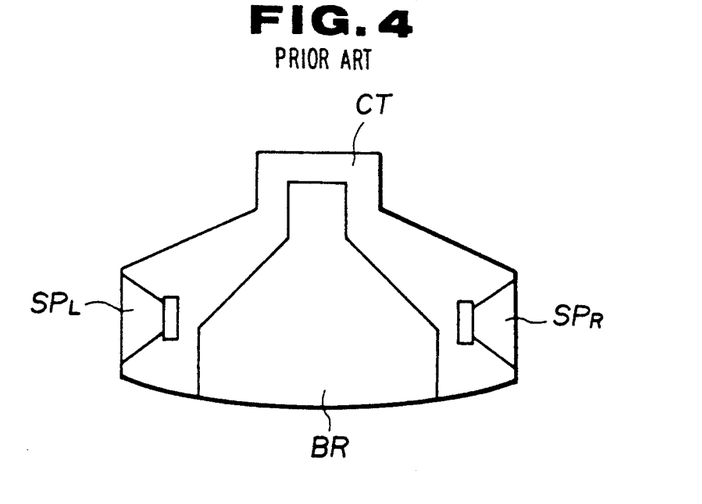

With a television receiver, shown in FIG. 1, speakers $SP_L$, $SP_R$ are embedded within the front sides of a cabinet CT substantially flush with and at left and right sides of a front surface of a Braun tube BR, that is, a television screen surface. With a separate type television receiver, shown in FIG.2, the cabinet CT is separated from speaker boxes $BX_L$, $BX_R$ and speakers $SP_L$, $SP_R$ are provided within the speaker boxes $BX_L$, $BX_R$ substantially flush with a television screen surface. With a television receiver shown in FIG.3, speakers $SP_L$, $SP_R$ are embedded within a cabinet CT at the back of the television screen surface, that is, at the back of a Braun tube BR. Finally, with a television receiver, shown in FIG.4, speakers $SP_L$, $SP_R$ are embedded within the lateral sides of a cabinet CT at the lateral sides of a Braun tube BR.

Meanwhile, with a television receiver of recent years, a high sound quality has been in demand in addition to a high picture quality and a large screen surface. On the other hand, it is desirable that the sound of a television receiver be radiated from the same surface as the television screen surface for affording compatibility or the sense of ambience with respect to the picture on the screen surface. It is also desirable that, even if the screen has a large surface, the cabinet of the receiver itself be not increased in size.

However, it has not been possible with the conventional television receivers, shown in FIGS.1 to 4, to satisfy simultaneously the demands for a large screen surface, a smaller cabinet size, high sound quality and compatibility or the sense of presence and ambience with respect to the television picture. That is, with the television receiver and the speaker devices shown in FIG.1, since the speakers $SP_L$, $SP_R$ are arranged substantially flush with the television screen surface, the size of the speaker devices $SP_L$, $SP_R$ is limited by the size of the cabinet CT and hence the sound of high sound quality can not be produced, as by emphasizing the low frequency sound, although the sense of compatibility of the sound with respect to the television picture may be achieved. In other words, with the television receiver of recent years, as shown in FIG. 1, the surface of the television receiver in its entirety as viewed from the front side is not increased, that is, the size of the cabinet CT is not increased, although the screen surface is enlarged, as a result of which the size of the speakers $SP_L$, $SP_R$ and that of a magnetic circuit are limited and hence the high sound quality can not be achieved. With the television receiver shown in FIG.2, in which the speaker boxes $BX_L$, $BX_R$ are formed as separate components, the size of the speaker boxes $BX_L$, $BX_R$ and the size of the cabinet CT, summed together, are necessarily increased, even although good sound quality may be achieved. With the television receiver shown in FIG.3, in which the speakers $SP_L$, $Sp_R$ are arranged at the back of the television screen at the rear lateral sides of the Braun tube BR, since these speakers are arranged at a certain angle with respect to the television screen surface, the sound is radiated in a direction conforming to the angle and hence the sense of ambience and compatibility with the television picture can not be produced, even although the speakers $SP_L$, $SP_R$ can be increased in size. Finally, with the television receiver shown in FIG.4, the speakers $SP_L$, $SP_R$ are directed completely to lateral sides, so that the sense of ambience and compatibility with the television picture becomes worse than in the case of the television receiver shown in FIG.3.

OBJECT AND SUMMARY OF THE INVENTION

In view of the above described status of the art, it is an object of the present invention to provide a speaker device for a television receiver by means of which the sound of high quality producing the sense of ambience and compatibility with the television picture may be obtained without enlarging the size of the receiver cabinet.

For accomplishing the above object, the present invention provides a speaker unit for a television receiver comprising speaker means provided at the back of a television screen surface, sound reflector means for reflecting at least a portion of the sound from said speaker means substantially in a forward direction from said television screen surface, and acoustic lens means provided on a surface coplanar with said television screen surface for controlling the radiating direction of the sound. The sound reflector means are provided for covering at least the central voice coil region of the speaker means and approximately 20 to 70% and preferably 30 to 60% of the total sound radiating surface of the speaker means.

According to the present invention, since the speaker unit is provided at the back of the television screen surface (phosphor surface of the Braun tube), the screen surface can be increased without limitations placed by the speaker unit, while the sound radiated from the speaker unit can be reflected in a forward direction by a reflector plate, and diffused by an acoustic lens, the foremost part of which lies in a plane coplanar with the television screen surface, the sound producing the sense of ambience and compatibility with the television picture may be obtained. Specifically, the speaker unit is provided at the back of the screen surface and at least a portion of the sound from the speaker unit is reflected in a substantially forward direction from the screen surface and radiated by the acoustic lens the forward end of which is arranged in a plane substantially coplanar with the screen surface, so that the well defined sound image may be produced and the sound of high quality producing the sense of ambience and compatibility with the television picture may be obtained.

DESCRIPTION OF THE PREFERRED EMBODIMENT

Referring to the drawings, an embodiment of the present invention will be explained in detail.

Figure 5:
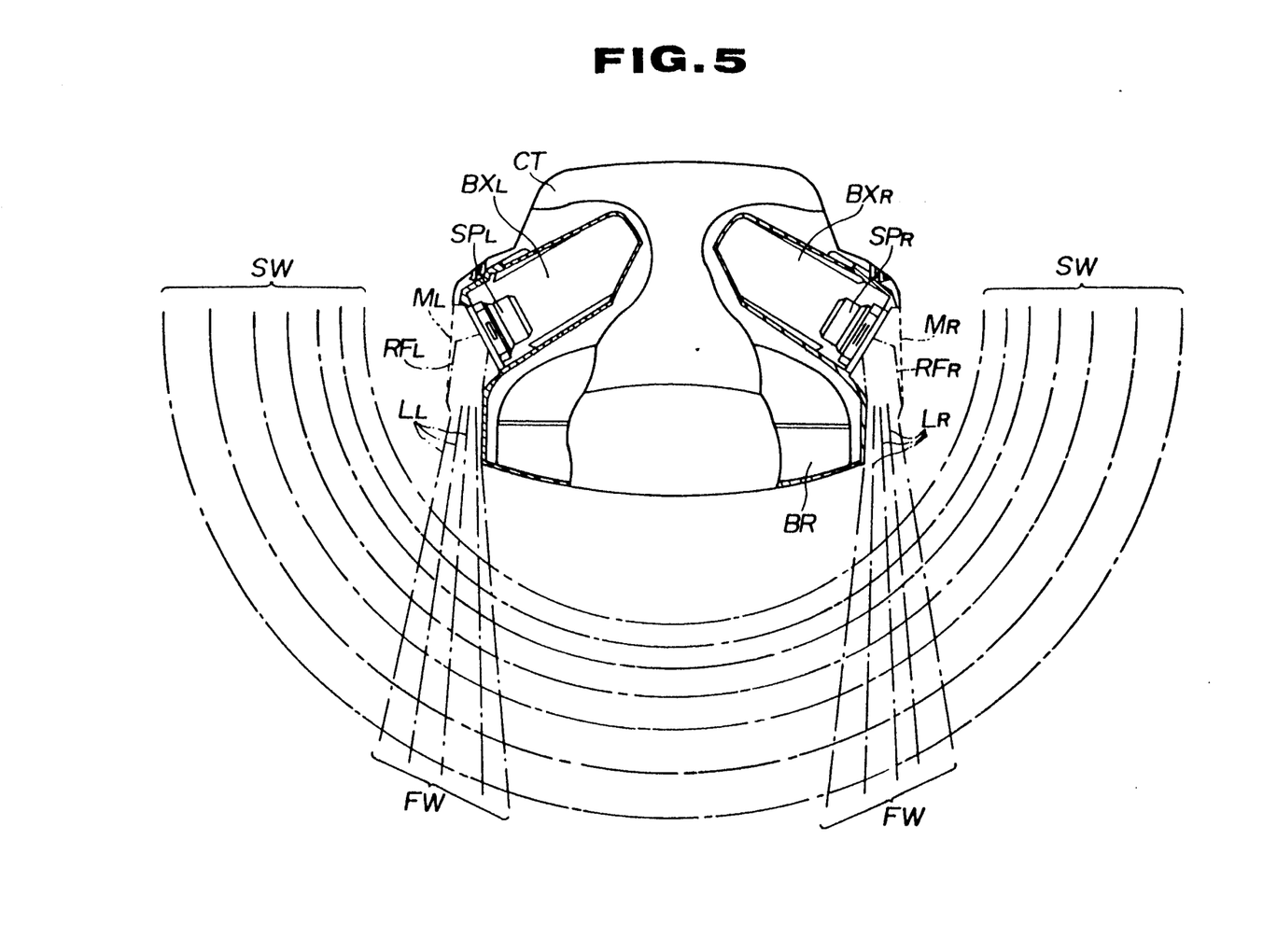
FIG.5 is a schematic plan view showing a speaker unit for a television receiver according to a preferred embodiment of the present invention, with portions of the speaker unit and the television receiver being broken away.

As shown in the schematic plan view of FIG.5, the speaker unit for the television receiver of the present embodiment comprises of left and right full-range stereophonic speakers $SP_L$. $SP_R$ arranged at the back of a television screen surface or at the rear lateral sides of a Braun tube BR, reflector plates $RF_L$, $RF_R$ for reflecting at least a portion of the sound from the speakers $SP_L$, $SP_R$ in a substantially forward direction from the screen surface, and acoustic lenses $L_L$, $L_R$, the forward end of which is disposed in a plane substantially coplanar with the screen surface and which is adapted for controlling the directivity of the radiated sound. Meanwhile, the sound from the speakers $SP_L$, $SP_R$ may also be monaural sound.

It is noted that the speakers $SP_L$, $SP_R$ are not provided in a plane coplanar with the television screen surface, but are provided at the rear lateral sides of the Braun tube BR within the receiver cabinet CT. That is, the speakers $SP_L$, $SP_R$ are provided at the rear lateral sides of the Braun tube BR where a wider area or space may be conserved depending on the shape of the Braun tube BR, so that the sound radiating surface or gauge and the capacities of the magnetic circuit and speaker boxes $BX_L$, $BX_R$ may be selected to be larger. Since the gauges of the speakers $SP_L$, $SP_R$ and the capacities of the magnetic circuit and the speaker boxes $SP_L$, $SP_R$ are selected to be larger with the present embodiment, the sound quality of, for example, the low-frequency sounds may be improved, while the cabinet CT may remain small-sized.

Figure 6:
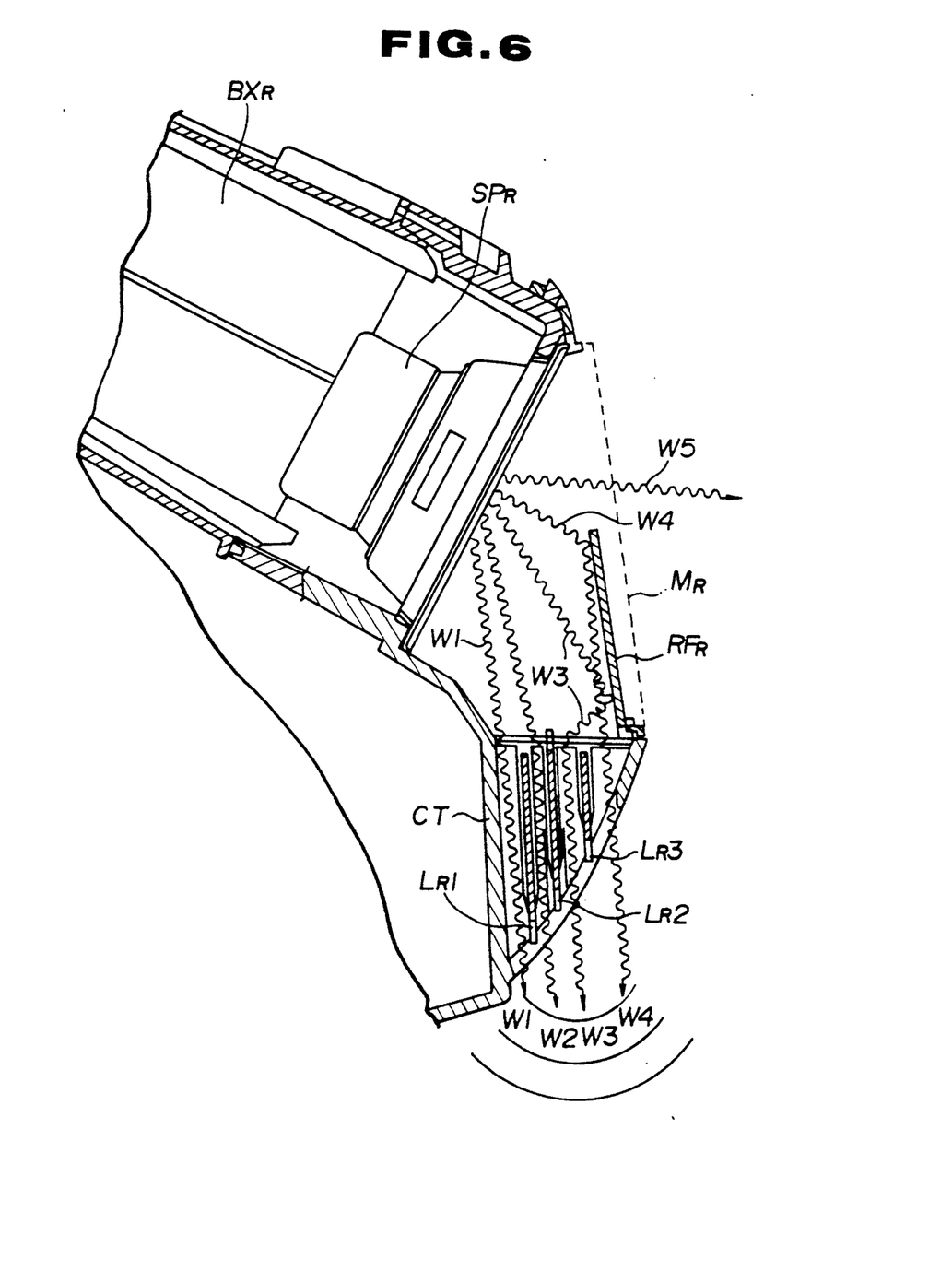
FIG.6 is an enlarged schematic plan view of the speaker unit, with a portion thereof being broken away.

Meanwhile, since the speakers $SP_L$, $SP_R$ of the present embodiment are arranged at the rear lateral sides of the Braun tube BR depending on the shape of the Braun tube, the sound radiating surfaces of the speakers $SP_L$, $SP_R$ are disposed at an angle with respect to the television screen surface. If the sound from these speakers $S_L$, $SP_R$ is directly taken out to outside in this case, it becomes difficult to produce the sense of ambience or the sense of compatibility with the television picture on account of sound directivity or the like. With this in view, with the speaker unit of the present embodiment, the sound from the speakers $SP_L$, $SP_R$ is adapted to be directed forwardly from the television screen surface by means of the reflector plates RFL, RFR and the acoustic lenses $L_L$, $L_R$, Referring to FIG.6, showing the right-side speaker $SP_R$ and a near-by region, sound waves radiated from the speaker $SP_R$ are transmitted through the reflector plate $RF_R$ and the acoustic lens $L_L$, comprising mid plates (lens plates) $L_R1$, $L_R2$ and $L_R3$, and thereby modified in their proceeding and diffusing directions, as indicated by sound waves W1 to W4. A sound wave W5, which is not transmitted through these reflector plates $RF_R$ or the acoustic lens $L_R$, is radiated to outside through a meshed plate $M_R$ having a large number of orifices in the form of a netting or a honeycomb.

Figure 7:
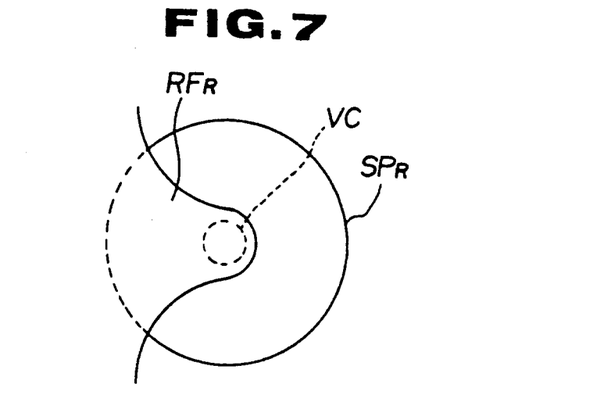
FIG. 7 is a schematic plan view showing a reflector plate and the sound radiating front surface of a speaker.

It is noted that the reflector plate RFR is arranged for overlying at least an inner region of a voice coil VC, as shown in FIG.7 showing the projection of the reflector plate on the front sound radiating surface of the speaker $SP_R$. By arranging the reflector plate $RF_R$ so as to overly at least the inner space of the voice coil VC, the mid to high frequency sounds, radiated from the central region of the speaker SPRY that is the voice coil VC and the near-by region, and exhibiting high directivity with respect to the front surface of the speaker $SP_R$, are reflected by the reflector plate $RF_R$ so as to be modified in their proceeding direction. The reflector plate $RF_R$ is so oriented that the sound reflected thereby is directed forwardly of the television screen surface. If the entire sound radiating surface of the speaker SPR is covered by the reflector plate $RF_R$, the sound undergoes suppression and deterioration in sound quality. In this consideration, the area of the sound radiating surface of the speaker SPR covered by the reflector plate $RF_R$ is selected in the present embodiment to be approximately 20 to 70% and preferably 30 to 60% of the total sound radiating surface of the speaker $SP_R$ In addition, the area of the central region of the sound radiating surface of the speaker $SP_R$ covered by the reflector surface $RF_R$ is preferably about twice the area of the inner space of the voice coil VC. Meanwhile, the reflector plate $RF_R$ may be designed so that its angle of orientation may be modified as desired for changing the direction of sound reflection in a desired manner.

By using the above described reflector plate $RF_R$, the sound radiated from the speaker SPR, above all, the mid to high frequency sounds exhibiting high directivity, may be radiated in a forward direction from the television screen surface, while being also directly radiated to outside by means of the meshed plate $M_R$, without producing sound suppression. On the other hand, the low frequency sounds from the speaker $SP_R$ are radiated to outside by means of the reflector plate $RF_R$ and the acoustic lens $L_R$, while being also radiated directly to outside by means of the meshed plate $M_R$, similarly to the mid to high frequency sounds. Since the low frequency sounds are generally low in directivity, the low frequency sounds directly radiated to outside by means of the meshed plate MR are also turned round towards the front side of the screen surface to produce the low frequency sound producing the sense of ambience and compatibility with the displayed picture.

It is noted that the reflector plate $RF_R$ may be molded of synthetic resins exhibiting high surface hardness and low inner losses, such as acrylonitrile-butadiene-styrene (ABS) or styrene. In this manner, the mid to high frequency sound may be reflected effectively.

Figure 8:
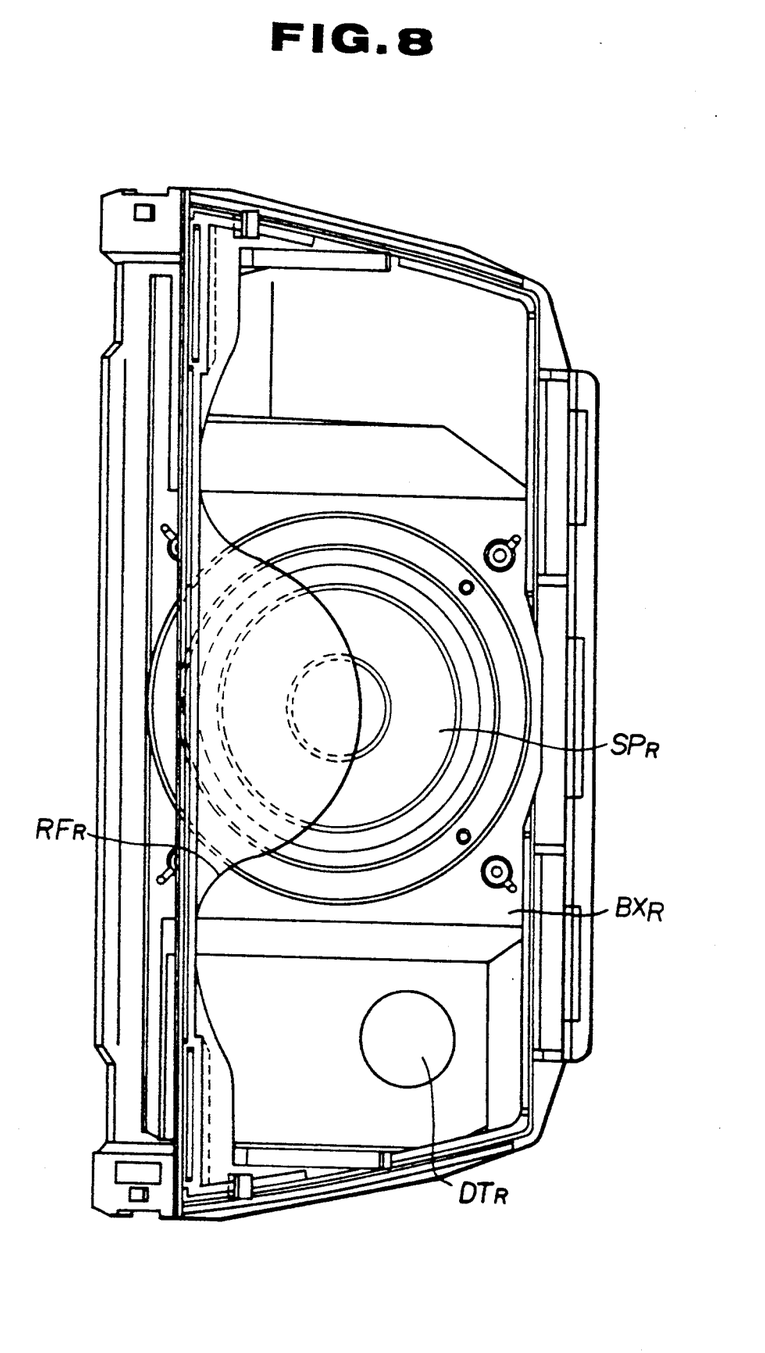
FIG. 8 is a front view showing the state in which the speaker and the reflector plate are actually mounted in the speaker unit.

FIG. 8 shows the speaker $SP_R$ and the reflector plate $RF_R$ actually built into the speaker unit which is viewed from the front side of the speaker $SP_R$, In FIG.8, DTR indicates a duct for taking out the sound within the speaker box $BX_R$ to outside.

Figure 9:
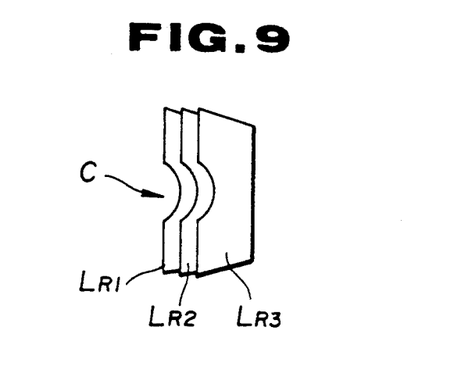
FIG. 9 is a perspective view showing an acoustic lens.

The acoustic lens $L_R$ is used for controlling sound directivity, that is, the direction and diffusion of the proceeding sound. Specifically, the direction of the proceeding sound may be modified as a function of the length of the gap between the mid plates (lens plates) $L_R1$, $LR_R2$ and $LR_R3$, that is, the distance between the inlet and the outlet of the sound or the length of the sound path. In addition, a semicircular notch C (FIG. 9) is provided in a central region of each of the mid plates $L_Ri$, $L_{R}2$ and $L_{R}3$ for expanding the sound from the speaker $SP_R$, that is, for converting the planar wave into a cylindrical wave or a spherical wave. It is noted that, considering the sound emanating from the speaker $SP_R$ in FIG. 6, the sound wave W1 schematically represents the sound wave travelling through a space between the mid plate Lhd R1 and the wall surface of the cabinet towards the Braun tube BR, the sound wave W2 the sound wave travelling through the space between the mid plates $L_R1$ and $L_{R}2$, the sound wave W3 the sound wave once reflected by, for example, the reflective plate $RF_R$ to travel subsequently through the space between the mid plates $L_{R}2$ and $L_{R}3$ and the sound wave W4 the sound wave once reflected by the reflector plate $RF_R$ to travel subsequently through the space between the mid plate $L_{R}3$ and the outer wall surface of the cabinet CT. However, the sound waves W1, W2 may be occasionally reflected by the reflector plate $RF_R$, while the sound waves W3, W4 may be transmitted directly through the gaps of the acoustic lens without having been once reflected by the reflector plate $RF_R$. Meanwhile, the sound direction may be changed as desired by changing the length of each sound duct of the acoustic lens $L_R$. For example, with the mid plate $L_R1$ of the maximum length, the mid plate $L_{R}3$ of the minimum length and the mid plate $L_{R}2$ of an intermediate length, the sound emanating from the acoustic lens $L_R$ is directed towards the center of the television screen surface. On the other hand, by reversing the relation of the sound duct lengths, the sound from the acoustic lens $L_R$ is directed away from the center of the television screen surface. The sound direction may also be changed by changing the mounting angles of the mid plates.

With the use of the above described acoustic lens $L_R$, it becomes possible to produce the expanded sound with improved directivity by aligning the wave fronts of the mid to high frequency sounds which are strongly directive and radiated in the form of an acute beam. Meanwhile, the sound radiated towards the front side FW and the sound surrounding the television receiver SW are shown schematically by chain-dotted lines in FIG. 5.

Figure 10:
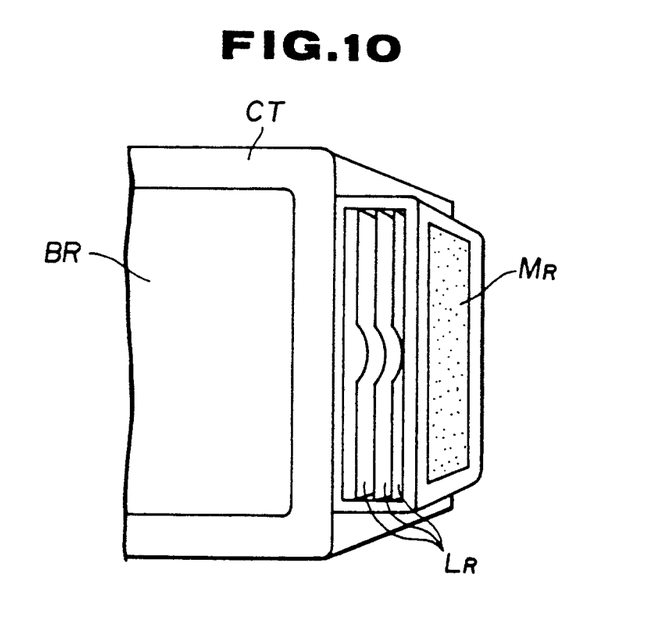
FIG. 10 is a partial perspective view showing an acoustic lens and a mesh plate actually mounted on a receive cabinet.

Meanwhile, the acoustic lens $L_R$ and the meshed plate $M_R$ are shown assembled to the cabinet CT in FIG. 10 which is a perspective view partially broken away.

With the above described present speaker unit for the television receiver, by arranging the speakers $SP_L$, $SP_R$ on the rear lateral sides of the Braun tube BR, the sound radiating surfaces or gauges of the speakers $SP_L$, $SP_R$ and the capacities of the magnetic circuit and the speaker boxes $BX_L$, $BX_R$ may be enlarged to enable the sound quality of the low frequency sounds, for example, to be improved. On the other hand, by reflecting at least a portion of the sound f rom the speakers $SP_L$, $SP_R$ by the reflector plates $RF_L$, $RF_R$ and radiating the sound towards the f ront side of the television screen surface by the acoustic lenses $L_L$, $L_R$, the forward sides of which are arranged substantially on the same surface as the television screen surface, the sound from the speakers $SP_L$, $SP_R$, above all, the strongly directive mid to high frequency sound, may be radiated towards the front side of the television screen surface to provide a more definite sound image and more expanded mid to high frequency sounds. Besides, since the sound f rom the speakers $SP_L$, $SP_R$ is radiated directly to outside through the meshed plates $M_L$, $M_R$ for preventing sound suppression as well as providing a sense of ambience having an extended sound field and producing low frequency sound compatible with the displayed picture.

Figure 11:
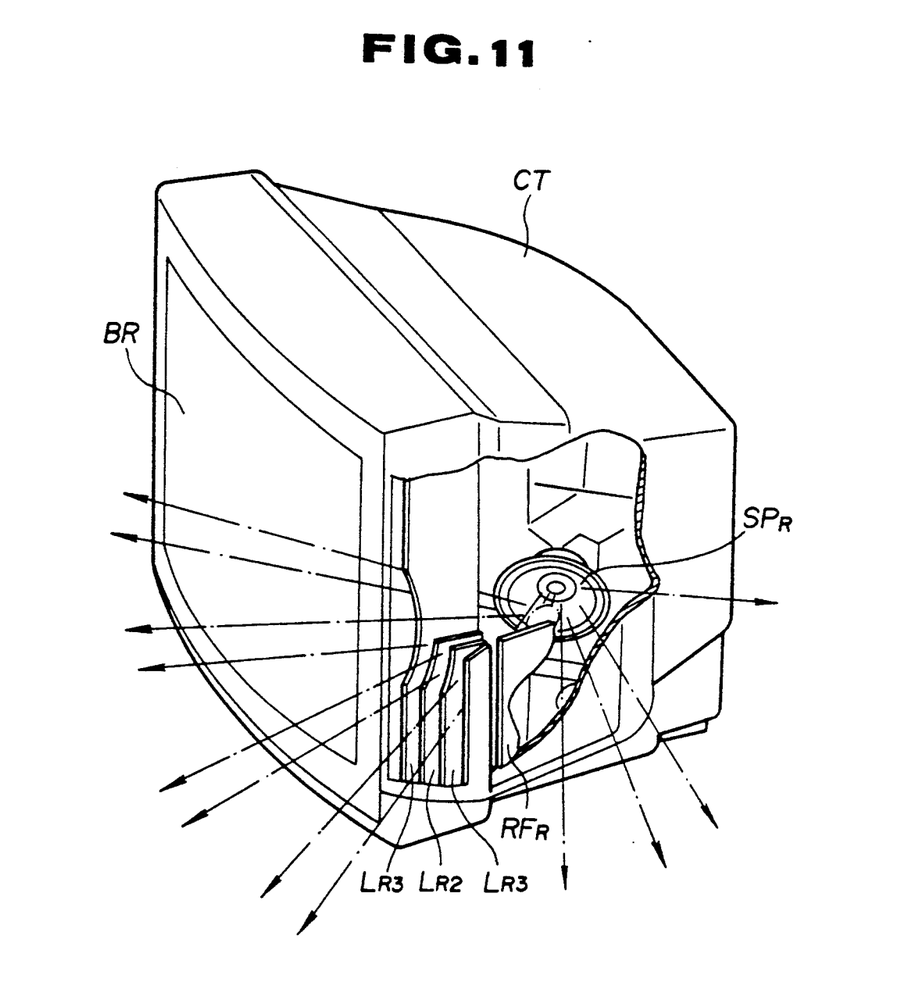
FIG. 11 is a perspective view of a television receiver fitted with the speaker unit of the present invention, with a portion of the receiver being broken away for showing the structure of the speaker unit.

Meanwhile, a television receiver of the present embodiment is shown in a perspective view of FIG. 11, shown partly broken away, in which the sound from the speaker $SP_R$ is radiated not only forwardly but also laterally of the television screen surface, as indicated by chain-dotted lines therein.

What is claimed is:

1. A speaker unit for a television receiver comprising speaker mean provided at the back of a television screen surface, sound reflector means covering a portion of the sound radiating surface of said speaker means and leaving a portion of said sound radiating surface uncovered for reflecting a portion of the sound from said speaker means substantially in a forward direction from said television screen surface, and acoustic lens mean provided on a surface copolanar with said television screen surface of controlling the radiating direction of the sound;

wherein said sound reflector means covers an area equal to about 30 to 60% of the entire sound radiating surface of said speaker means.

2. A speaker unit as claimed in claim 1 wherein said speaker means comprises left and right side speakers for stereophonic sound reproduction.

3. A speaker unit as claimed in claim 2 wherein said left and right side speakers are arranged to form an obtuse angle with respect to the televisions screen surface.

4. A speaker unit as claimed in claim 1 wherein said sound reflector means forms a part of a cabinet of the television receiver.

5. A speaker unit as claimed in claim 1 wherein said speaker mean is enclosed within associated speaker boxes.

* * * * *

UNITED STATES PATENT AND TRADEMARK OFFICE
CERTIFICATE OF CORRECTION

PATENT NO. : 5,274,709
DATED : December 28, 1993
INVENTOR(S) : Hiroshi Koizumi

It is certified that error appears in the above-indentified patent and that said Letters Patent is hereby corrected as shown below:

Col. 1, lines 16 & 17, change "f rom" to --from--
lines 53 & 54, change "f rom" to --from--
Col. 2, line 51, change "well defined" to --well-defined--
Col. 3, line 19, delete "of"
line 20, after "$SP_L$" change "." to --,--
line 52, change "$S_L$" to --$SP_L$--
line 60, change "RFL, RFR" to --$RF_L$, $RF_R$--
Col. 4, line 5, change "RFR" to --$RF_R$--
line 12, change "SPRY" to --$SP_R$,--
line 19, change "SPR" to --$SP_R$--
line 23, change "SPR" to --$SP_R$--
line 26, after "$SP_R$" insert --.--
line 35, change "SPR" to --$SP_R$--
line 48, change "MR" to --$M_R$--
line 59, after "$SP_R$" change "," to --.--
same line, change "DTR" to --$DT_R$--
line 67, change "$LR_R2$ and $LR_R3$" to --$L_R2$ and $L_R3$--

UNITED STATES PATENT AND TRADEMARK OFFICE
CERTIFICATE OF CORRECTION

PATENT NO. : 5,274,709
DATED : December 28, 1993
INVENTOR(S) : Hiroshi Koizumi

It is certified that error appears in the above-indentified patent and that said Letters Patent is hereby corrected as shown below:

Col. 5, line 3, change "$L_R i$" to --$L_R 1$--
      line 9, change "Lhd R1" to --$L_R 1$--
Col. 6, line 3, change "f rom" to --from--
      line 5, change "f ront" to --front--
      line 13, change "f rom" to --from--

In the Claims:

Col. 6, line 27, change "mean" to --means--
      line 33, change "mean" to --means--
      line 34, change "copolanar" to --coplanar--
      line 51, change "mean" to --means--

Signed and Sealed this

Sixth Day of June, 1995

BRUCE LEHMAN

*Attest:*

*Attesting Officer*      *Commissioner of Patents and Trademarks*